United States Patent
Parihar et al.

(10) Patent No.: US 10,659,113 B1
(45) Date of Patent: May 19, 2020

(54) MULTIPLE INPUT MULTIPLE OUTPUT (MIMO) CONTROL IN A WIRELESS ACCESS NODE

(71) Applicant: Sprint Communications Company L.P., Overland Park, KS (US)

(72) Inventors: Vanil Parihar, Overland Park, KS (US); Nitesh Manchanda, Overland Park, KS (US); Sreekar Marupaduga, Overland Park, KS (US); Rashmi S. Kumar, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/533,093

(22) Filed: Aug. 6, 2019

(51) Int. Cl.
| | |
|---|---|
| *H04B 7/0413* | (2017.01) |
| *H01Q 1/52* | (2006.01) |
| *H04L 27/26* | (2006.01) |
| *H04B 7/06* | (2006.01) |
| *H04L 5/00* | (2006.01) |

(52) U.S. Cl.
CPC ........... *H04B 7/0413* (2013.01); *H01Q 1/521* (2013.01); *H04B 7/0632* (2013.01); *H04L 27/2655* (2013.01); *H04L 5/0007* (2013.01)

(58) Field of Classification Search
CPC .. H04B 7/0413; H04B 7/0602; H04B 7/0604; H04W 88/10
See application file for complete search history.

(56) References Cited

U.S. PATENT DOCUMENTS

| | | | |
|---|---|---|---|
| 9,485,788 B2 | 11/2016 | Bengtsson et al. | |
| 9,654,261 B2 | 5/2017 | Lorca Hernando | |
| 9,698,938 B2 | 7/2017 | Lee et al. | |
| 10,014,976 B2 | 7/2018 | Kim et al. | |
| 2016/0065388 A1* | 3/2016 | Kakishima | ........... H04B 17/391 |
| 2017/0214501 A1 | 7/2017 | Byun et al. | |

FOREIGN PATENT DOCUMENTS

CN 103069911 A 4/2013

* cited by examiner

*Primary Examiner* — Kevin Kim

(57) ABSTRACT

A source wireless access node serves User Equipment (UEs) over a Three-Dimensional (3D) Multiple Input Multiple Output (MIMO) antenna array and over a Two-Dimensional (2D) MIMO antenna array. The source wireless access node wirelessly exchanges user data with the UEs over the 3D MIMO antenna array. The source wireless access node detects a loss-of-synchronization. The source wireless access node detects an interference condition at neighbor wireless access nodes. When the interference condition at the neighbor wireless access nodes and the loss-of-synchronization at the source wireless access node occur simultaneously, the source wireless access node network disables the 3D MIMO antenna array and wirelessly exchanges additional user data with the UEs over the 2D MIMO antenna array. When the neighbor interference condition or the loss-of-synchronization terminate, the source wireless access node enables and uses the 3D MIMO antenna array.

20 Claims, 7 Drawing Sheets

__US 10,659,113 B1__

MULTIPLE INPUT MULTIPLE OUTPUT (MIMO) CONTROL IN A WIRELESS ACCESS NODE

TECHNICAL BACKGROUND

Wireless communication networks provide wireless data services to wireless user devices. Exemplary wireless data services include voice-calling, internet-access, and machine communications. Exemplary wireless user devices comprise phones, computers, drones, and robots. The wireless communication networks have wireless access nodes that exchange wireless signals with the wireless user devices. The wireless user devices detect wireless signals that are broadcast by the wireless access nodes, and a given wireless user device generally attaches to the wireless access node that has the strongest wireless signal. The wireless user devices continually measure and report signal strengths for wireless access points that they detect. The wireless access nodes share these signal strength reports.

The wireless access nodes have Two-Dimensional (2D) Multiple Input Multiple Output (MIMO) antenna arrays and Three-Dimensional (3D) MIMO antenna arrays. The 2D MIMO antenna arrays use horizontal beamforming to serve the wireless user devices. The 3D MIMO antenna arrays use both horizontal and vertical beamforming to serve the wireless user devices. The 3D MIMO antenna arrays are sometimes called "massive" MIMO arrays, and the massive MIMO arrays typically exhibit superior spectral efficiency over the 2D MIMO arrays. Unfortunately, the 3D MIMO antenna arrays generate significant radio interference at neighbor wireless access nodes.

The wireless access nodes maintain highly accurate clocks. The clocks are periodically synchronized with network clocks and/or Global Positioning Satellite (GPS) signals. The wireless access nodes uses their clocks to synchronize the wireless user devices. When a wireless access node loses synchronization, the ability to synchronize the wireless user devices is lost. The loss-of-synchronization may be caused by an alignment timer time-out due to a lack of user data exchanges, a GPS or clock fault, an Orthogonal Frequency Division Multiplexing (OFDM) time-slot shift, or some other synchronization condition. Unfortunately, the loss-of-synchronization generates additional radio interference at the neighbor wireless access nodes.

TECHNICAL OVERVIEW

A source wireless access node serves User Equipment (UEs) over a Three-Dimensional (3D) Multiple Input Multiple Output (MIMO) antenna array and over a Two-Dimensional (2D) MIMO antenna array. The source wireless access node wirelessly exchanges user data with the UEs over the 3D MIMO antenna array. The source wireless access node detects a loss-of-synchronization. The source wireless access node detects an interference condition at neighbor wireless access nodes. When the interference condition at the neighbor wireless access nodes and the loss-of-synchronization at the source wireless access node occur simultaneously, the source wireless access node network disables the 3D MIMO antenna array and wirelessly exchanges additional user data with the UEs over the 2D MIMO antenna array. When the neighbor interference condition or the loss-of-synchronization terminate, the source wireless access node enables and uses the 3D MIMO antenna array.

DETAILED DESCRIPTION

Figure 1:
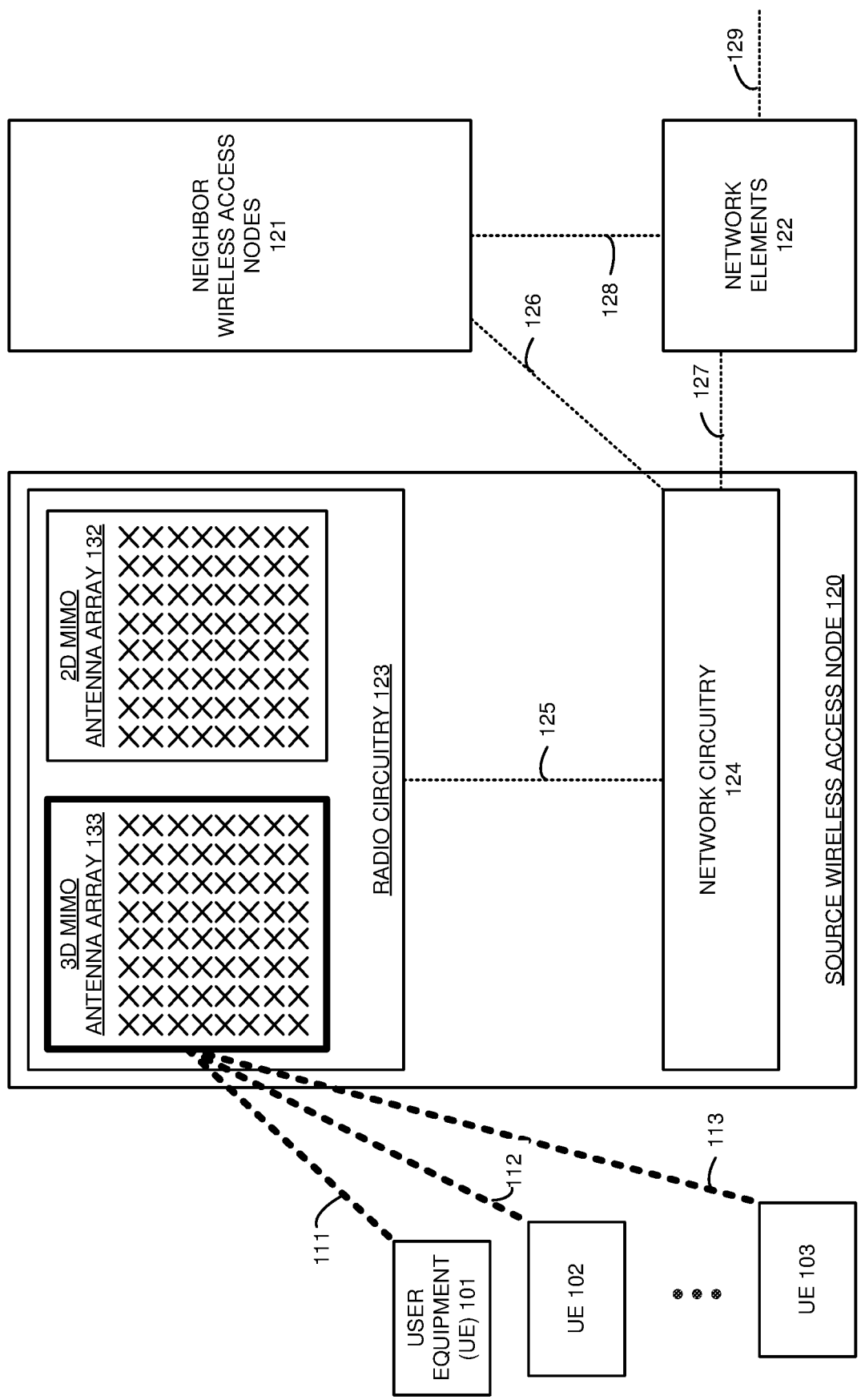
FIG. 1 illustrates a source wireless access node to serve User Equipment (UEs) over a Two-Dimensional (2D) Multiple Input Multiple Output (MIMO) antenna array and over a Three-Dimensional (3D) MIMO antenna array.
Figure 2:
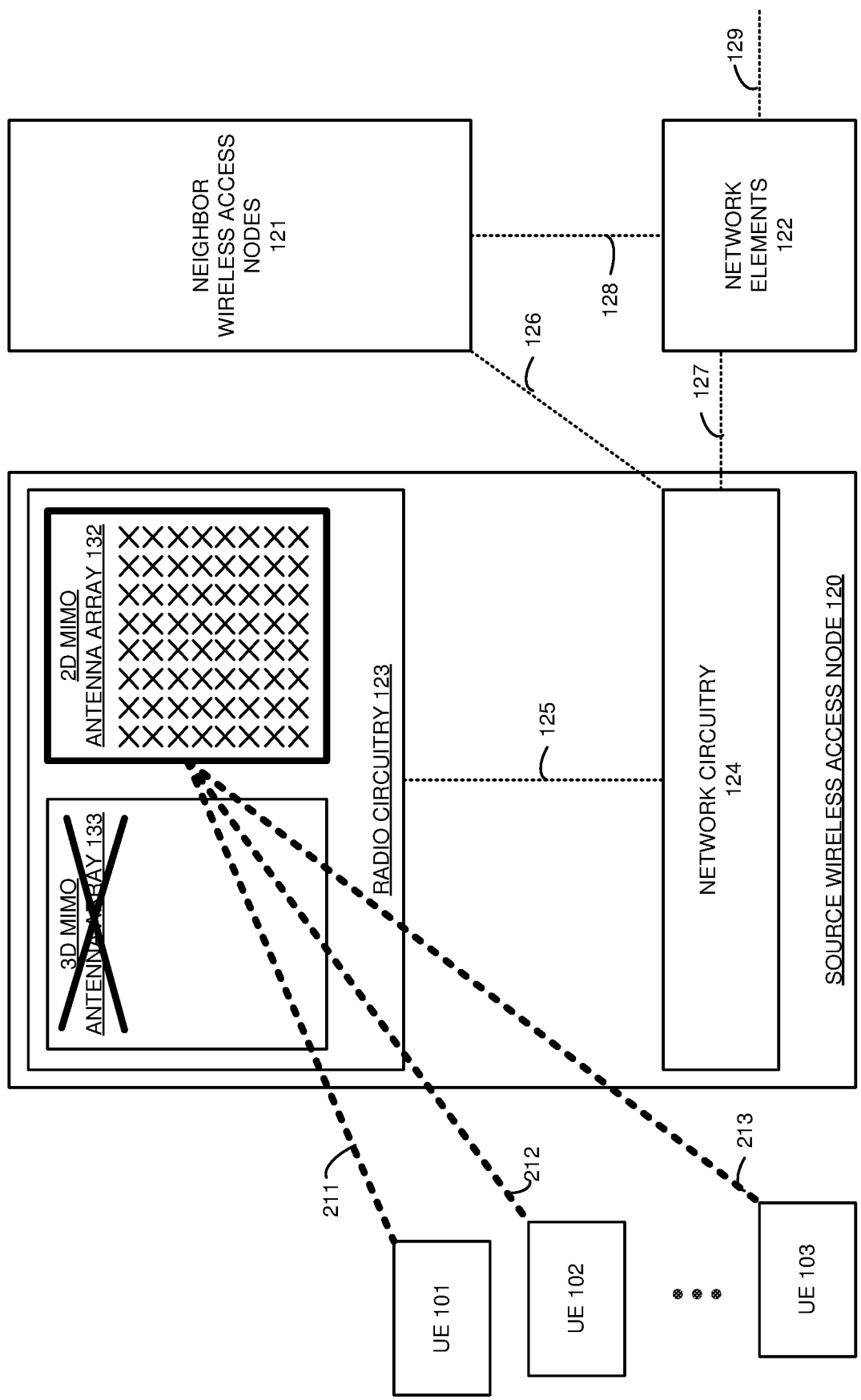
FIG. 2 illustrates the source wireless access node that serves the UEs over the 2D MIMO antenna array and the 3D MIMO antenna array.

FIGS. 1-2 illustrate source wireless access node 120 to serve User Equipment (UEs) 101-103 over Two-Dimensional (2D) Multiple Input Multiple Output (MIMO) antenna array 132 and over Three-Dimensional (3D) MIMO antenna array 133. Source wireless access node 120 serves UEs 101-103 with wireless data services like media-streaming, social-networking, machine communications, vehicle control, and/or some other user application. Source wireless access node 120 comprises radio circuitry 123 and network circuitry 124 that are coupled by data links 125. Radio circuitry 123 comprises 2D MIMO antenna array 132 and 3D MIMO antenna array 133.

UEs 101-103 and source wireless access node 120 are coupled over wireless links 111-113 that use frequencies in the low-band, mid-band, millimeter band, and/or some other part of the wireless spectrum. Source wireless access node 120 is coupled to neighbor wireless access nodes 121 over data links 126. Source wireless access node 120 is coupled to network elements 122 over data links 127. Neighbor wireless access nodes 121 are coupled to network elements 122 over data links 128. Network elements 130 are coupled to external systems over data links 129. Data links 125-129 may comprise intermediate communication nodes and networks.

UEs 101-103 might comprise phones, computers, robots, vehicles, sensors, or some other apparatus with communication circuitry. Neighbor wireless access nodes 121 are configured and operate like wireless access node 120. Network elements 122 comprise Access and Mobility Management Functions (AMFs), Session Management Functions (SMFs), User Plane Functions (UPFs), Serving Gateways (S-GWs), Mobility Management Entities (MMEs), and/or some other networking systems.

Radio circuitry 123 comprises MIMO antenna arrays 132-133, modulators, amplifiers, filters, digital/analog interfaces, microprocessors, memory, software, and bus connections. The microprocessors comprise Digital Signal Processors (DSPs), Central Processing Units (CPUs), Graphical Processing Units (GPUs), Field Programmable Gate Arrays (FPGAs), Application-Specific Integrated Circuits (ASICs), and/or the like. The memories comprise Random Access Memory (RAM), flash circuitry, disk drives, and/or the like. Network circuitry 124 comprises microprocessors, memory, software, and bus connections. The microprocessors comprise CPUs, GPUs, ASICs, and/or the like. The memories comprise RAM, flash circuitry, disk drives, and/or the like.

In circuitry 123-124, the memories store the software like operating systems and network applications. The microprocessors execute the operating systems and network applications to wirelessly exchange network signaling and user data with UEs 101-103 over wireless links 111-113. The microprocessors execute the operating systems and network applications to exchange network signaling and user data with neighbor wireless access points 121 and network elements 122 over data links 126-127. Exemplary network applications comprise Physical Layer (PHY), Media Access Control (MAC), Radio Link Control (RLC), Packet Data Convergence Protocol (PDCP), Radio Resource Control (RRC), and Service Data Adaptation Protocol (SDAP).

In operation, network circuitry 124 exchanges network signaling and user data with neighbor wireless access nodes 121 and network elements 122 over data links 126-127. Network circuitry 124 exchanges user data and network signaling with radio circuitry 123 over data links 125. Radio circuitry 123 wirelessly exchanges network signaling and user data with UEs 101-103 over 3D MIMO antenna array 133 and wireless links 111-113. Network circuitry 124 detects a loss-of-synchronization at source wireless access node 120. The loss-of-synchronization at source wireless access node 120 comprises: 1) an alignment timer time-out, 2) a lack of user data exchanges for a time period, 3) a Global Positioning Satellite (GPS) system fault, 3) an Orthogonal Frequency Division Multiplexing (OFDM) time-slot shift, and/or 4) some other time synchronization condition.

Network circuitry 124 detects an interference condition at neighbor wireless access nodes 121. The interference condition at neighbor wireless access nodes 121 may be indicated by: 1) an increase in average received signal strength at neighbor wireless access nodes 121 that exceeds a strength threshold for a time period, 2) a decrease in average Channel Quality Indices (CQIs) at neighbor wireless access nodes 121 that falls below a CQI threshold for a time period, 3) a decrease in average Signal-to-Noise and Interference Ratios (SINRs) at neighbor wireless access nodes 121 that falls below a SINR threshold for a time period, and/or 4) some other radio interference metric. When the interference condition and loss-of-synchronization occur simultaneously, network circuitry 124 responsively disables 3D MIMO antenna array 133.

Referring to FIG. 2, network circuitry 124 has disabled 3D MIMO antenna array 133 because the interference condition and loss-of-synchronization are occurring simultaneously. Network circuitry 124 still exchanges network signaling and user data with neighbor wireless access nodes 121 and network elements 122 over data links 126-127. Network circuitry 124 exchanges user data and network signaling with radio circuitry 123 over data links 125. In response to the simultaneous interference condition and loss-of-synchronization, radio circuitry 123 wirelessly exchanges network signaling and user data with UEs 101-103 over 2D MIMO antenna array 132 and wireless links 211-213. Advantageously, the disabling of 3D antenna array 133 and the use of 2D antenna array 132 during the loss-of-synchronization mitigates any excessive radio interference at neighbor wireless access nodes 121.

Figure 3:
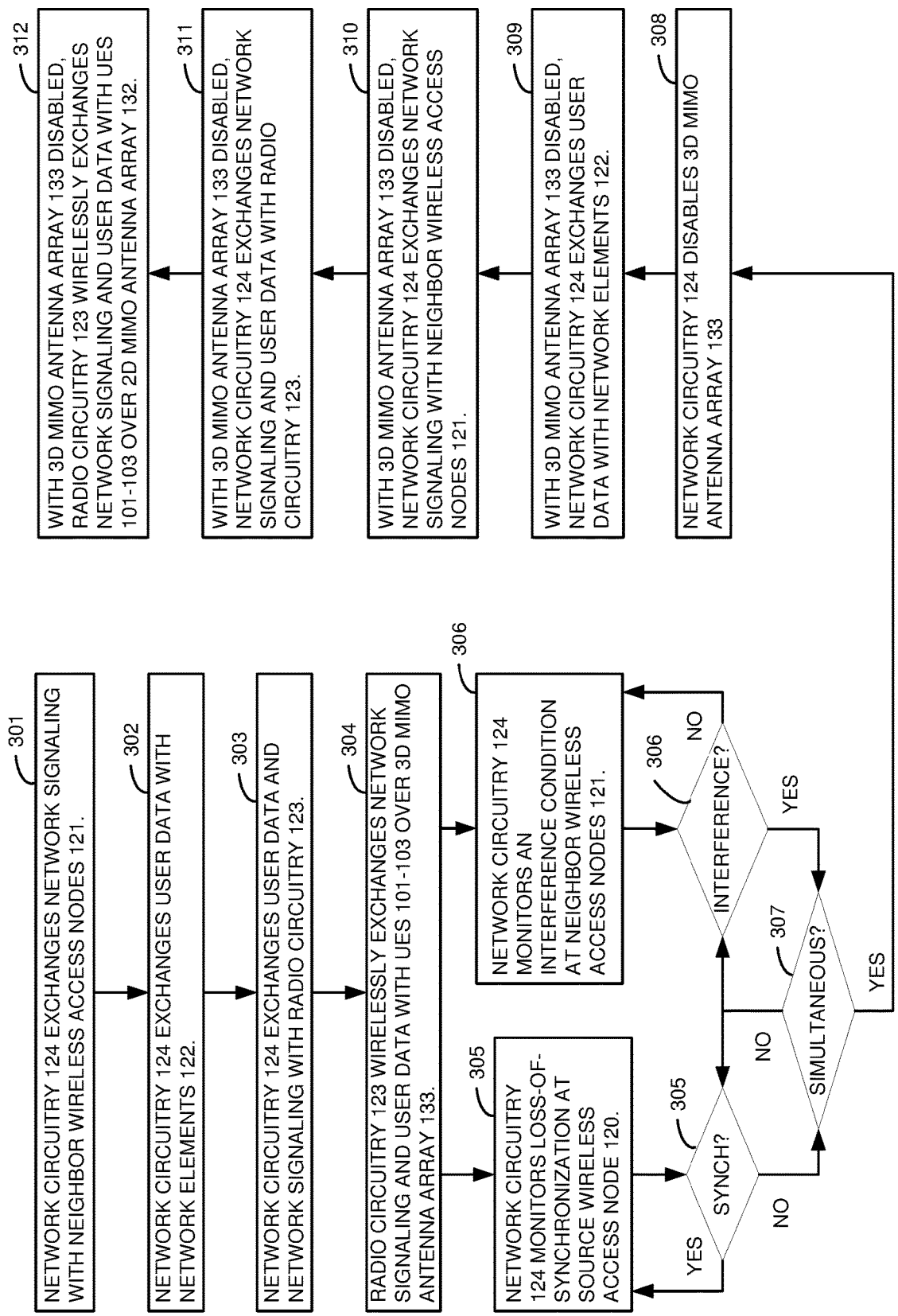
FIG. 3 illustrates the operation of the source wireless access node to serve the UEs over the 2D MIMO antenna array and the 3D MIMO antenna array.

FIG. 3 illustrates the operation of wireless access node 120 to serve UEs 101-103 over 2D MIMO antenna array 132 and 3D MIMO antenna array 133. Network circuitry 124 exchanges network signaling with neighbor wireless access nodes 121 (301). Network circuitry 124 exchanges user data with network elements 122 (302). Network circuitry 124 exchanges user data and network signaling with radio circuitry 123 (303). Radio circuitry 123 wirelessly exchanges network signaling and user data with UEs 101-103 over 3D MIMO antenna array 133 (304).

Network circuitry 124 detects a loss-of-synchronization at source wireless access node 120 (305). Network circuitry 124 detects an interference condition at neighbor wireless access nodes 121 (306). Network circuitry 124 detects when the interference condition and the loss-of-synchronization occur simultaneously (307). When the interference condition and loss-of-synchronization occur simultaneously (307), network circuitry 124 responsively disables 3D MIMO antenna array 133 (308).

With 3D MIMO antenna array 133 disabled, network circuitry 124 exchanges user data with network elements 122 (309). Network circuitry 124 exchanges network signaling with neighbor wireless access nodes 121 (310). Network circuitry 124 exchanges user data and network signaling with radio circuitry 123 (311). Radio circuitry 123 wirelessly exchanges network signaling and user data with UEs 101-103 over 2D MIMO antenna array 132 (312).

Figure 4:
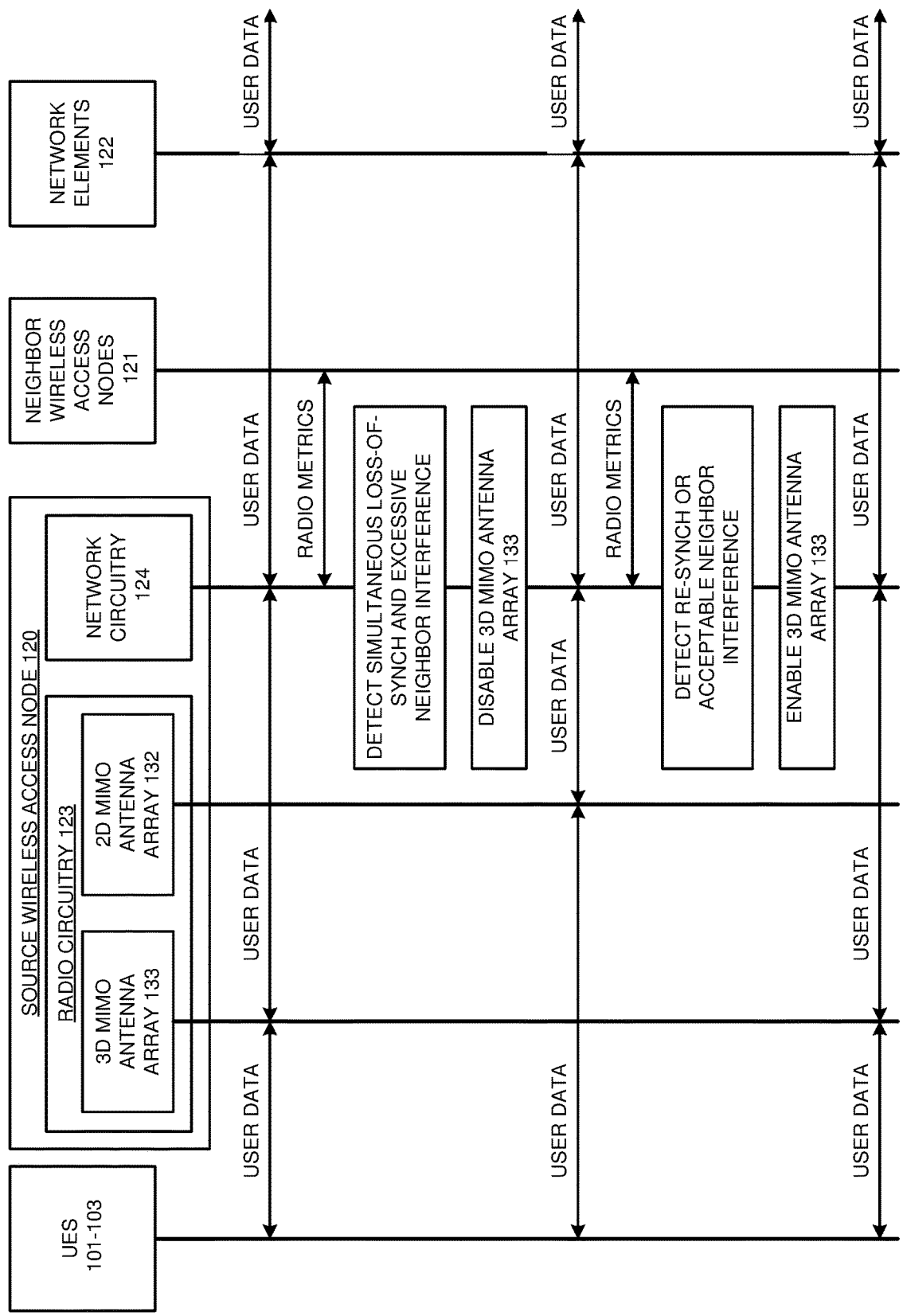
FIG. 4 illustrates the operation of the source wireless access node to serve the UEs over the 2D MIMO antenna array and the 3D MIMO antenna array.

FIG. 4 illustrates the operation of wireless access node 120 to serve UEs 101-103 over 3D MIMO antenna array 133 and 2D MIMO antenna array 132. UEs 101-103 and 3D MIMO antenna array 133 exchange user data. 3D MIMO antenna array 133 and network circuitry 124 exchange the user data. Network circuitry 124 and network elements 122 exchange the user data. Network elements 122 exchange the user data with external systems like the internet or enterprise servers.

Network circuitry 124 and neighbor wireless access nodes 121 exchange radio metrics like signal strength, noise, and interference measurements. For example, wireless access nodes 120-121 may share data that indicates received signal strength and channel quality for various UEs including UEs 101-103. Network circuitry 124 processes these radio metrics to detect an interference condition at neighbor wireless access nodes 121. For example, network circuitry 124 may calculate the average received signal strength at neighbor wireless access nodes 121 and detect when the average received signal strength at neighbor wireless access nodes 121 exceeds a signal strength threshold for a time period. Network circuitry 124 receives and processes timing information to determine when source wireless access node 120 experiences a loss-of-synchronization. For example, network circuitry 124 may detect a loss-of-alignment, frame shift, or clock alarm that indicates the loss-of-synchronization.

When the interference condition for neighbor wireless access nodes 121 and the loss-of-synchronization for source wireless access node 120 occur simultaneously, network circuitry 124 responsively disables 3D MIMO antenna array 133. UEs 101-103 and 2D MIMO antenna array 132 now exchange user data. 2D MIMO antenna array 132 and network circuitry 124 exchange the user data. Network circuitry 124 and network elements 122 exchange the user data. Network elements 122 exchange the user data with the external systems.

Network circuitry 124 and neighbor wireless access nodes 121 continue to exchange radio metrics. Network circuitry 124 processes the radio metrics to detect when the interference condition at neighbor wireless access nodes 121 becomes acceptable. For example, network circuitry 124 may detect when the average received signal strength at neighbor wireless access nodes 121 falls below the signal strength threshold for the time period. Network circuitry 124 receives and processes timing information to determine when source wireless access node 120 attains re-synchronization. For example, network circuitry 124 may exchange user data to perform realignment or may reboot GPS circuitry resynchronize source wireless access node 120.

When the interference condition for neighbor wireless access nodes 121 stops or when the loss-of-synchronization for source wireless access node 120 ceases, then network circuitry 124 responsively enables 3D MIMO antenna array 133. UEs 101-103 and 3D MIMO antenna array 133 now exchange user data. 3D MIMO antenna array 133 and network circuitry 124 exchange the user data. Network circuitry 124 and network elements 122 exchange the user data. Network elements 122 exchange the user data with the external systems.

Figure 5:
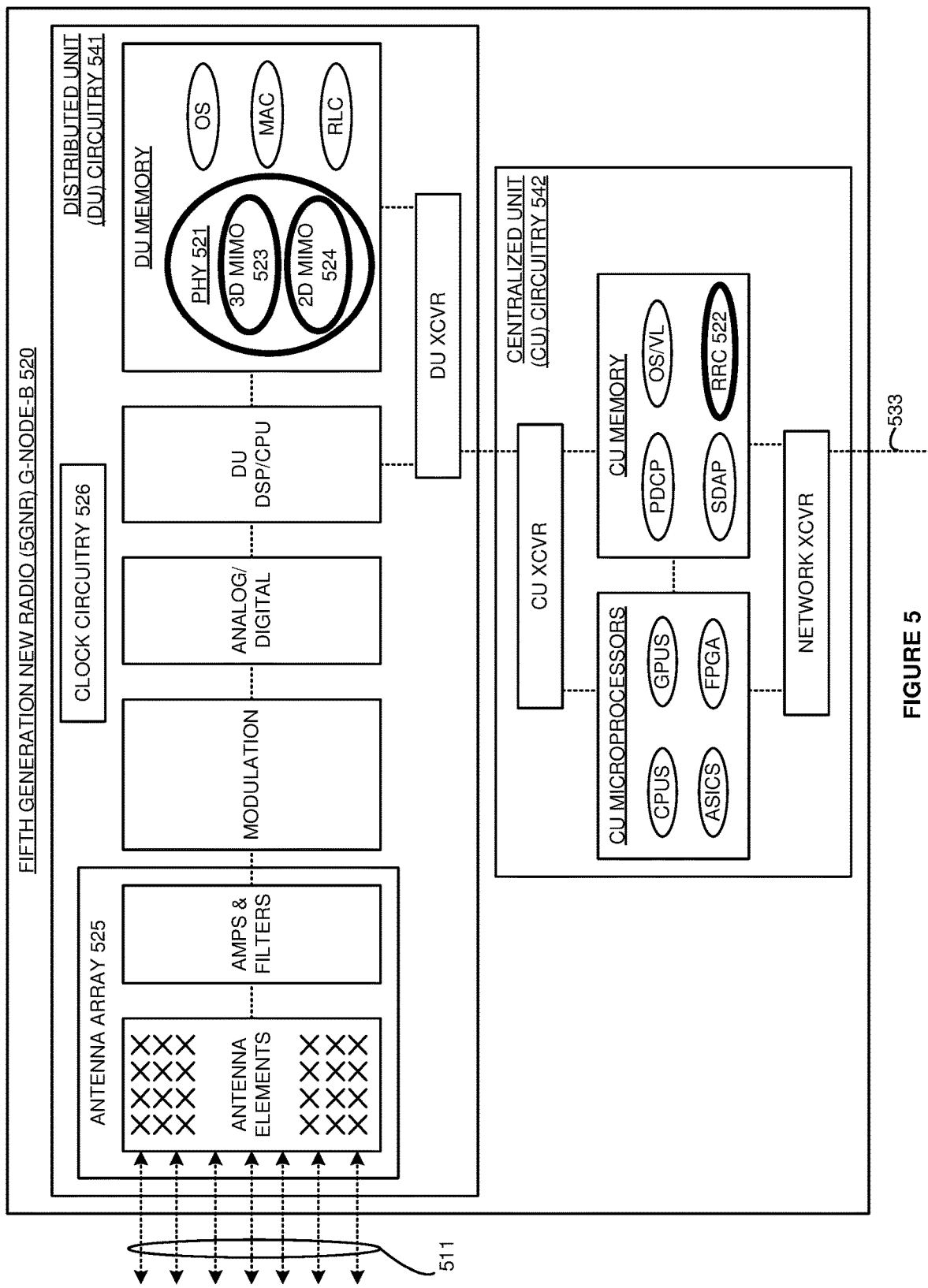
FIG. 5 illustrates a Fifth Generation New Radio (5GNR) gNodeB to serve 5GNR UEs over a 2D MIMO antenna array and a 3D MIMO antenna array.

FIG. 5 illustrates Fifth Generation New Radio (5GNR) gNodeB 520 to serve 5GNR UEs over a 2D/3D MIMO antenna array 525. 5GNR gNodeB 520 is an example of wireless access node 120, although node 120 may differ. 5GNR gNodeB 520 comprises 5GNR Distributed Unit (DU) circuitry 541 and Centralized Unit (CU) circuitry 542. DU circuitry 541 comprises clock circuitry 526, antenna array 525 (antenna elements, amplifiers (AMPS), filters), modulation, Analog-to-Digital (A/D), DU Digital Signal Processors (DSP), DU Central Processing Units (CPU), DU memory, and DU transceivers (XCVR) that are coupled over bus circuitry. CU circuitry 542 comprises CU microprocessors, CU memory, CU transceivers, and network transceivers that are coupled over bus circuitry.

In 5GNR DU circuitry 541, the antenna elements in array 525 are coupled to 5GNR UEs over wireless 5GNR links 511. The DU transceivers in 5GNR DU circuitry 541 are coupled to the CU transceivers in CU circuitry 542 over RLC/PDCP links. The 5GNR memory stores an operating system and network applications for 5GNR Physical Layer (PHY) 521, 5GNR Media Access Control (MAC), and 5GNR Radio Link Control (RLC). PHY 521 comprises 3D MIMO module 523 and 2D MIMO module 524. 3D MIMO module 523 supports Massive-MIMO (M-MIMO) with vertical and horizontal beamforming by independently controlled antenna elements. 2D MIMO module supports MIMO with horizontal beamforming by independently controlled columns of antenna elements.

The network transceivers in CU circuitry 542 are coupled to: 1) AMFs over N2 links, 2) UPFs over N3 links, and 3) gNodeBs over X2 links. The CU memory stores an operating system, virtual layer (VL) components, and network applications. The virtual layer components comprise hypervisor modules, virtual switches, virtual machines, and/or the like. The network applications comprise 5GNR Packet Data Convergence Protocol (PDCP), 5GNR Radio Resource Control (RRC) 522, and 5GNR Service Data Adaptation Protocol (SDAP). In this example, 5GNR DU circuitry 541 hosts the network applications for 5GNR PHY, 5GNR MAC, and 5GNR RLC, while CU circuitry 542 hosts the network applications for 5GNR PDCP, 5GNR RRC 522, and 5GNR SDAP. In other examples, circuitry 541-542 may use other DU/CU network application splits.

In DU circuitry 541, the antenna elements receive wireless signals from 5GNR UEs that transport user data and network signaling. In DU circuitry 541, the antenna elements transfer corresponding electrical UL signals through duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the DSPs. The DSP recovers UL 5GNR symbols from the UL digital signals. The DU CPUs execute 5GNR PHY 521, MAC, and RLC to recover UL Protocol Data Units (PDUs) from the UL 5GNR symbols. The 5GNR RLC transfers UL PDUs over the DU transceiver and CU transceiver to the 5GNR PDCP in CU circuitry 542.

In CU circuitry 542, the microprocessors execute the 5GNR PDCP, RRC 522, and SDAP to generate UL N3 data and N2 signaling from the UL 5GNR PDUs. 5GNR RRC 522 transfers the UL N2 signaling to AMFs over the network transceiver and data links 533. The 5GNR SDAP transfers the UL N3 data to UPFs over the network transceiver and data links 533. 5GNR RRC 522 receives DL N2 signaling from the AMFs over the network transceiver and data links 533. The 5GNR SDAP receives DL N3 data from the UPFs over the network transceiver and data links 533. The CU microprocessors execute 5GNR RRC 522, SDAP, and PDCP to generate DL SDAP data and RRC signaling from the DL N3 data and N2 signaling. The 5GNR PDCP transfers DL PDUs having the DL SDAP data and RRC signaling to the 5GNR RLC in DU circuitry 541 over the CU and DU transceivers.

In DU circuitry 541, the 5GNR RLC, MAC, and PHY 521 process the DL RRC signaling and SDAP data to generate DL 5GNR symbols. The 5GNR DSP processes the DL 5GNR symbols to generate corresponding digital DL signals for the 5GNR A/D. The 5GNR A/D converts the digital DL signals into analog DL signals for modulation. Modulation up-converts the DL signals to their carrier frequencies. The amplifiers boost the modulated DL signals for the filters which attenuate unwanted out-of-band energy. The filters transfer the filtered DL signals through duplexers to the antenna elements. The electrical DL signals drive the antenna elements to emit corresponding wireless 5GNR signals that transport the DL SDAP data and RRC signaling to the 5GNR UEs.

In CU circuitry 542, the 5GNR SDAP maps between the N3 data and Service Data Units (SDUs) while 5GNR RRC 522 maps between the N2 signaling and SDUs. The 5GNR SDAP and RRC 522 exchange their SDUs with the 5GNR PDCP. The 5GNR PDCP maps between the SDUs and Protocol Data Units (PDUs). The PDCP exchanges the 5GNR PDUs with the 5GNR RLC in 5GNR DU circuitry 541. In 5GNR DU circuitry 541, the 5GNR RLC maps between the PDUs from CU circuitry 542 and MAC logical channels. The 5GNR RLC exchanges the RRC signaling and SDAP data with the 5GNR MAC over the MAC logical channels. The 5GNR MAC maps between the MAC logical channels and MAC transport channels. The 5GNR MAC exchanges the 5GNR RRC signaling and SDAP data with the 5GNR PHY 521 over the MAC transport channels. 5GNR PHY 521 maps between the MAC transport channels and PHY transport channels. 5GNR PHY 521 exchanges the 5GNR RRC signaling and SDAP data with the 5GNR PHYs in the 5GNR UEs over the PHY transport channels in wireless links 511.

RRC 522 functions comprise authentication, security, handover control, status reporting, Quality-of-Service (QoS), network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY 520 functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

In particular, 5GNR RRC 522 exchanges X2 signaling with the RRCs in neighbor gNodeBs. The X2 signaling indicates radio metrics like Received Signal Strength Indicators (RSSIs) and Channel Quality Indices (CQIs). 5GNR RRC 522 indicates the average neighbor RSSI and average neighbor CQI to PHY 521 over the PDCP, RLC, MAC, and CU/DU transceivers. The 5GNR SDAP exchanges user data with PHY 521 over the PDCP, RLC, MAC, and CU/DU transceivers. In PHY 521, 3D MIMO module 523 exchanges network signaling and user data with the 5GNR UEs over antenna array 525 which is operating in the M-MIMO mode.

PHY 521 detects a loss-of-synchronization at gNodeB 520 by identifying an alignment time-out, clock fault, or 5GNR time/phase shift. PHY 521 detects an interference condition at the neighbor gNodeBs when the average RSSI for the neighbor gNodeBs exceeds a strength threshold for a time period or when the average CQI for the neighbor gNodeBs falls below a quality threshold for a time period.

When the interference condition and the loss-of-synchronization occur simultaneously, PHY 521 responsively disables 3D MIMO module 523 and uses 2D MIMO module 524. The 5GNR SDAP exchanges additional user data with PHY 521 over the PDCP, RLC, MAC, and CU/DU transceivers. In PHY 521, 2D MIMO module 524 exchanges the additional network signaling and user data with the 5GNR UEs over antenna array 525 which is now operating in a standard (non-massive) MIMO mode. When the interference condition or the loss-of-synchronization ceases, PHY 521 responsively enables and uses 3D MIMO module 523. In PHY 521, 3D MIMO module 523 again exchanges network signaling and user data with the 5GNR UEs over antenna array 525 which again operates in the M-MIMO mode.

Figure 6:
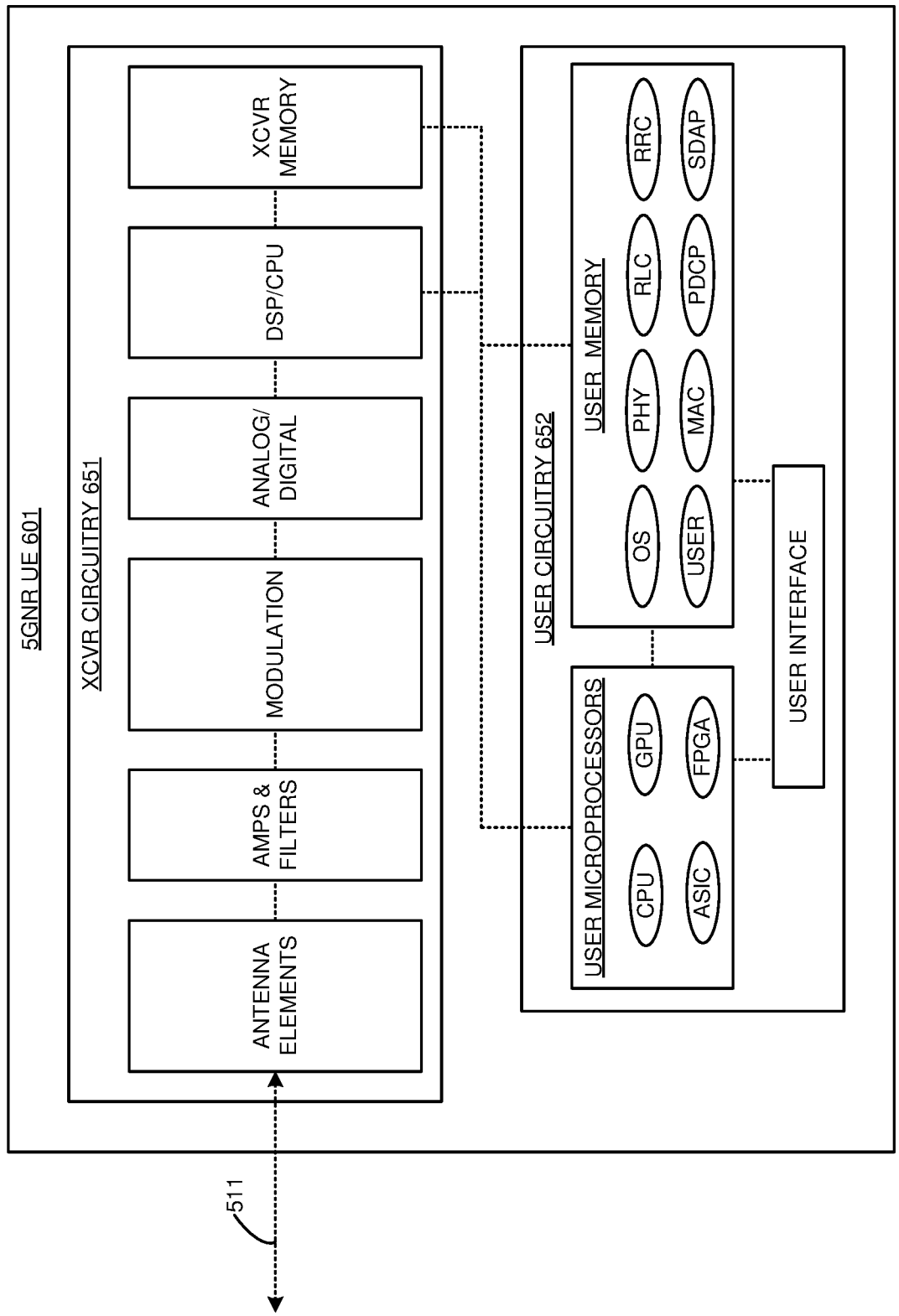
FIG. 6 illustrates a 5GNR UE that is served the 5GNR gNodeB over the 2D MIMO antenna array and the 3D MIMO antenna array.

FIG. 6 illustrates 5GNR UE 601 that is served by 5GNR gNodeB 520 over antenna array 525. 5GNR UE 601 is an example of UEs 101-103, although UEs 101-103 may differ. 5GNR UE 601 comprises transceiver circuitry 651 and user circuitry 652 which are interconnected over bus circuitry. Transceiver circuitry 651 comprises antenna elements, amplifiers, filters, modulation, analog/digital interfaces, DSP, CPU, and memory. User circuitry 652 comprises user microprocessors, user memory, and user interfaces. The user interface comprises graphic displays, machine controllers, sensors, cameras, transceivers, and/or some other user components. The user microprocessors comprise CPUs, GPUs, ASICs, and/or some other computer circuitry. The user memory comprises volatile and non-volatile data storage like RAM, flash, and/or disk. The UE memory stores an operating system (OS), user applications (User), and 5GNR network applications. The 5GNR network applications comprise PHY, MAC, RLC, PDCP, RRC, and SDAP. The microprocessors execute the operating system, user applications, and 5GNR network applications to exchange user data and network signaling with 5GNR gNodeB 520 over 5GNR links 511.

The user applications store Uplink (UL) user data and signaling in the UE memory. The 5GNR network applications process the UL user data/signaling and Downlink (DL) network signaling to generate UL network signaling. The network applications transfer the UL user data and network signaling to the transceiver memory in transceiver circuitry 651. In transceiver circuitry 651, the DSP processes the UL user data and network signaling to transfer corresponding digital UL signals to the A/D interfaces. The A/D interfaces convert the digital UL signals into analog UL signals for modulation. Modulation up-converts the analog UL signals to their carrier frequencies. The amplifiers boost the modulated UL signals for the filters which attenuate unwanted out-of-band energy. The filters transfer the UL signals through duplexers to the antennas. The electrical UL signals drive the antennas to emit corresponding wireless signals that transport the UL user data and network signaling to 5GNR gNodeB 520.

In the transceiver circuitry 651, the antenna elements receive wireless 5GNR signals that transport user data and network signaling from 5GNR gNodeB 520. The antenna elements transfer corresponding electrical DL signals through duplexers to the amplifiers. The amplifiers boost the received DL signals for filters which attenuate unwanted energy. In modulation, demodulators down-convert the DL signals from their carrier frequencies. The A/D interfaces convert the analog DL signals into digital DL signals for the DSPs. The DSPs recover DL data from the digital DL signals. The DSPs transfer the DL data to the UE memory. The microprocessors execute the 5GNR network applications to process the DL data to recover the DL user data and network signaling. The microprocessors execute the network applications to store the DL user data and signaling in the user memory. The user applications process their user data and signaling in the user memory and responsively drive the user interfaces.

Figure 7:
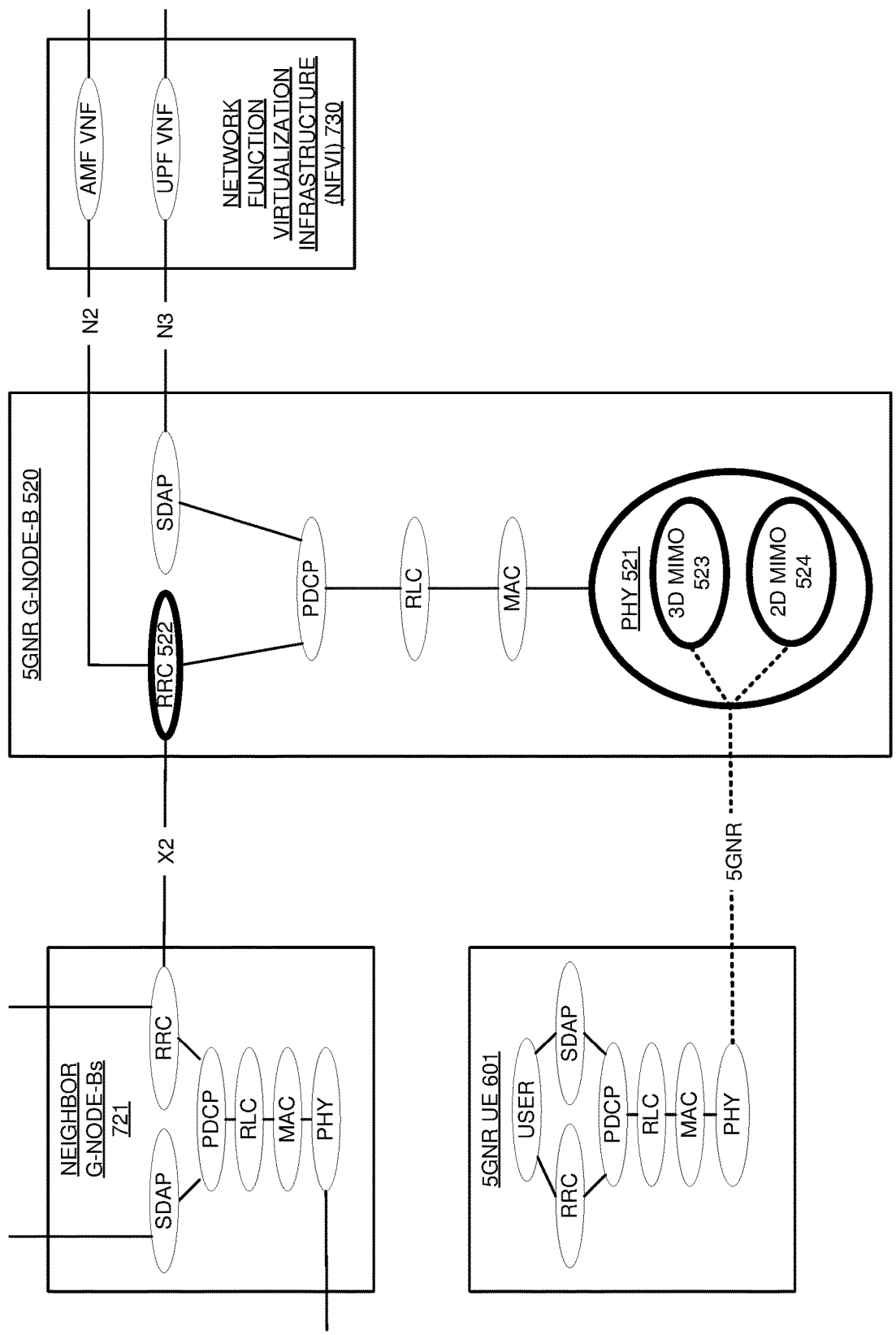
FIG. 7 illustrates the operation of the 5GNR gNodeB to serve the 5GNR UE over the 2D MIMO antenna array and the 3D MIMO antenna array.

FIG. 7 illustrates the operation of 5GNR gNodeB 520 to serve 5GNR UE 601 over antenna array 525. Network Function Virtualization Infrastructure (NFVI) 730 comprises computer hardware, hardware drivers, operating systems, virtual layers, Management and Orchestration (MANO), and Virtual Network Functions (VNFs). NFVI 730 executes the hardware drivers, operating systems, virtual layers, MANO, and VNFs to serve 5GNR UE 601 and other UEs over 5GNR gNodeB 520 and neighbor gNodeBs 721.

RRC 522 in 5GNR gNodeB 520 and the RRC in 5GNR UE 610 exchange 5GNR signaling over the PDCP, RLC, MAC, and PHY 521. RRC 522 and the RRCs in neighbor 5GNR gNodeBs 721 exchange 5GNR signaling over X2 links. RRC 522 and the Access and Mobility Management Function (AMF) VNF in NFVI 730 exchange 5GNR signaling over N2 links. The SDAP in 5GNR gNodeB 520 and the User Plane Function (UPF) VNF in NFVI 730 exchange 5GNR data over N3 links. The SDAP in 5GNR gNodeB 520 and the SDAP in UE 601 exchange 5GNR data over the PDCP, RLC, MAC, and PHY 521. In 5GNR gNodeB 520, PHY 521 uses 3D MIMO module 523 for the 5GNR data exchange. The SDAPs in neighbor 5GNR gNodeBs 721 and the SDAPs in other UEs also exchange 5GNR data over their PDCP, RLC, MAC, and PHY layers.

PHY 521 detects a loss-of-synchronization at gNodeB 520. The loss-of-synchronization at source wireless access node 120 comprises: 1) an alignment timer time-out, 2) a lack of user data exchanges for a time period, 3) a Global Positioning Satellite (GPS) system fault, 3) an Orthogonal Frequency Division Multiplexing (OFDM) time shift, and/or 4) some other time synchronization condition. PHY 521 processes radio metrics that were received by RRC 522 from neighbor gNodeBs 721 over the X2 links to detect an interference condition at neighbor gNodeBs 721. The interference condition at neighbor gNodeBs 721 may be indicated by: 1) an increase in average received signal strength at neighbor gNodeBs 721 that exceeds a strength threshold for a time period, 2) a decrease in average Channel Quality Indices (CQIs) at gNodeBs 721 that falls below a CQI threshold for a time period, 3) a decrease in average Signal-to-Noise and Interference Ratios (SINRs) at neighbor gNodeBs 721 that falls below a SINR threshold for a time period, and/or 4) some other radio interference metric. When the interference condition and loss-of-synchronization occur simultaneously, PHY 521 disables 3D MIMO module 523 and uses 2D MIMO module 524.

The SDAP in 5GNR gNodeB 520 and the UPF VNF in NFVI 730 exchange 5GNR data over N3 links. The SDAP in 5GNR gNodeB 520 and the SDAP in UE 601 exchange 5GNR data over the PDCP, RLC, MAC, and PHY 521. In 5GNR gNodeB 520, PHY 521 uses 2D MIMO module 524 for the 5GNR data exchange. The SDAPs in neighbor 5GNR gNodeBs 721 and the SDAPs in other UEs also exchange 5GNR data over their PDCP, RLC, MAC, and PHY layers. PHY 521 detects re-synchronization at gNodeB 520 and/or the end of the interference condition at neighbor gNodeBs 721. When the interference condition and/or the loss-of-synchronization stop, PHY 521 enables and uses 3D MIMO module 523.

The wireless data network circuitry described above comprises computer hardware and software that form special-purpose wireless network circuitry to serve wireless UEs with 3D MIMO antenna arrays. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless network circuitry to serve wireless UEs with 3D MIMO antenna arrays.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a source wireless access node to serve User Equipment (UEs) over a Three-Dimensional (3D) Multiple Input Multiple Output (MIMO) antenna array and over a Two-Dimensional (2D) MIMO antenna array, the method comprising:
   network circuitry exchanging user data with radio circuitry;
   the radio circuitry wirelessly exchanging the user data with the UEs over the 3D MIMO antenna array;
   the network circuitry detecting a loss-of-synchronization for the source wireless access node;
   the network circuitry detecting an interference condition at neighbor wireless access nodes;
   when the interference condition at the neighbor wireless access nodes and the loss-of-synchronization at the source wireless access node occur simultaneously, the network circuitry responsively disabling the 3D MIMO antenna array and exchanging additional user data with the radio circuitry; and
   the radio circuitry wirelessly exchanging the additional user data with the UEs over the 2D MIMO antenna array when the interference condition at the neighbor wireless access nodes and the loss-of-synchronization at the source wireless access node occur simultaneously.

2. The method of claim 1 wherein the interference condition at the neighbor wireless access nodes is indicated by an increase in average received signal strengths at the neighbor wireless access nodes that exceeds a strength threshold for a time period.

3. The method of claim 1 wherein interference condition at the neighbor wireless access nodes is indicated by a decrease in average Channel Quality Indices (CQIs) at the neighbor wireless access nodes that falls below a CQI threshold for a time period.

4. The method of claim 1 wherein interference condition at the neighbor wireless access nodes is indicated by a decrease in average Signal-to-Noise and Interference Ratios (SINRs) at the neighbor wireless access nodes that falls below a SINR threshold for a time period.

5. The method of claim 1 wherein the loss-of-synchronization at the source wireless access node comprises an alignment timer time-out.

6. The method of claim 1 wherein the loss-of-synchronization at the source wireless access node comprises a lack of data exchanges for a time period.

7. The method of claim 1 wherein the loss-of-synchronization at the source wireless access node comprises a Global Positioning Satellite (GPS) system fault.

8. The method of claim 1 wherein the loss-of-synchronization at the source wireless access node comprises an Orthogonal Frequency Division Multiplexing (OFDM) time-slot shift.

9. The method of claim 1 wherein the network circuitry comprises a Physical Layer that detects when the loss-of-synchronization at the source wireless access node and the interference condition at the neighbor wireless access nodes occur simultaneously.

10. The method of claim 1 wherein the network circuitry comprises a Fifth Generation New Radio (5GNR) Physical Layer that detects when the loss-of-synchronization at the source wireless access node and the interference condition at the neighbor wireless access nodes occur simultaneously.

11. A source wireless access node to serve User Equipment (UEs) over a Three-Dimensional (3D) Multiple Input Multiple Output (MIMO) antenna array and over a Two-Dimensional (2D) MIMO antenna array, the source wireless access node comprising:
- network circuitry configured to exchange user data with radio circuitry;
- the radio circuitry configured to wirelessly exchange the user data with the UEs over the 3D MIMO antenna array;
- the network circuitry configured to detect a loss-of-synchronization for the source wireless access node;
- the network circuitry configured to detect an interference condition at neighbor wireless access nodes;
- when the interference condition at the neighbor wireless access nodes and the loss-of-synchronization at the source wireless access node occur simultaneously, the network circuitry configured to responsively disable the 3D MIMO antenna array and exchange additional user data with the radio circuitry; and
- the radio circuitry configured to wirelessly exchange the additional user data with the UEs over the 2D MIMO antenna array when the interference condition at the neighbor wireless access nodes and the loss-of-synchronization at the source wireless access node occur simultaneously.

12. The source wireless access node of claim 11 wherein the interference condition at the neighbor wireless access nodes is indicated by an increase in average received signal strengths at the neighbor wireless access nodes that exceeds a strength threshold for a time period.

13. The source wireless access node of claim 11 wherein interference condition at the neighbor wireless access nodes is indicated by a decrease in average Channel Quality Indices (CQIs) at the neighbor wireless access nodes that falls below a CQI threshold for a time period.

14. The source wireless access node of claim 11 wherein interference condition at the neighbor wireless access nodes is indicated by a decrease in average Signal-to-Noise and Interference Ratios (SINRs) at the neighbor wireless access nodes that falls below a SINR threshold for a time period.

15. The source wireless access node of claim 11 wherein the loss-of-synchronization at the source wireless access node comprises an alignment timer time-out.

16. The source wireless access node of claim 11 wherein the loss-of-synchronization at the source wireless access node comprises a lack of data exchanges for a time period.

17. The source wireless access node of claim 11 wherein the loss-of-synchronization at the source wireless access node comprises a Global Positioning Satellite (GPS) system fault.

18. The source wireless access node of claim 11 wherein the loss-of-synchronization at the source wireless access node comprises an Orthogonal Frequency Division Multiplexing (OFDM) time-slot shift.

19. The source wireless access node of claim 11 wherein the network circuitry comprises a Physical Layer configured to detect when the loss-of-synchronization at the source wireless access node and the interference condition at the neighbor wireless access nodes occur simultaneously.

20. The wireless access node of claim 11 wherein the network circuitry comprises a Fifth Generation New Radio (5GNR) Physical Layer configured to detect when the loss-of-synchronization at the source wireless access node and the interference condition at the neighbor wireless access nodes occur simultaneously.

* * * * *